US012800301B2

(12) United States Patent
Honda et al.

(10) Patent No.: US 12,800,301 B2
(45) Date of Patent: Nov. 17, 2026

(54) SURFACE MEASURING DEVICE, PROCESSING DEVICE, AND SURFACE MEASURING METHOD

(71) Applicant: MITSUI HIGH-TEC, INC., Fukuoka (JP)

(72) Inventors: Toshifumi Honda, Fukuoka (JP); Daisuke Tokunaga, Fukuoka (JP)

(73) Assignee: MITSUI HIGH-TEC, INC., Fukuoka (JP)

(*) Notice: Subject to any disclaimer, the term of this patent is extended or adjusted under 35 U.S.C. 154(b) by 288 days.

(21) Appl. No.: 18/667,118

(22) Filed: May 17, 2024

(65) Prior Publication Data

US 2024/0393111 A1 Nov. 28, 2024

(30) Foreign Application Priority Data

May 24, 2023 (JP) ................................ 2023-085617

(51) Int. Cl.
*G01B 21/20* (2006.01)
*G01B 13/22* (2006.01)
*G01B 21/30* (2006.01)

(52) U.S. Cl.
CPC .................................... *G01B 21/20* (2013.01)

(58) Field of Classification Search
CPC ........ G01B 21/00; G01B 21/20; G01B 21/30; G01B 13/00; G01B 13/22; G01B 11/30
See application file for complete search history.

(56) References Cited

U.S. PATENT DOCUMENTS 6,807,845 B2 * 10/2004 Halbinger .............. G01B 13/00 73/37.5
7,021,120 B2 * 4/2006 Carter ................. G01L 19/0092 73/37.5

(Continued)

FOREIGN PATENT DOCUMENTS

JP 2006275826 A * 10/2006
JP 2019-45372 3/2019

(Continued)

OTHER PUBLICATIONS

Machine Translation of JP-2006275826-A (Year: 2006).*
Machine Trnaslation of KR-20180043891-A (Year: 2018).*
Machine Translation of WO-2015103931-A1 (Year: 2015).*

*Primary Examiner* — Nguyen Q. Ha
(74) *Attorney, Agent, or Firm* — Sterne, Kessler, Goldstein & Fox P.L.L.C.

(57) ABSTRACT

A surface measuring device includes a stage, a sensor unit, a supply unit, and a control unit. The control unit is configured to execute first processing of operating the supply unit such that gas that has flowed through an internal flow paths is blown downward from blow-out holes of first to N-th nozzles, second processing of operating at least one of the stage and the sensor unit such that the sensor unit scans a surface of a measurement object during operation of the supply unit by the first processing, and third processing of calculating a separation distance between each of the first to N-th nozzles and the surface of the measurement object based on a flow rate of the gas measured in each of first to N-th air sensors during scanning of the sensor unit by the second processing.

13 Claims, 11 Drawing Sheets

(56) References Cited

U.S. PATENT DOCUMENTS

| | | | | |
|---|---|---|---|---|
| 7,325,445 | B1 * | 2/2008 | Bowman | G01B 13/22<br>73/104 |
| 2019/0017816 | A1 * | 1/2019 | Nellissen | G03F 7/70625 |
| 2019/0072382 | A1 | 3/2019 | Hirano | |
| 2022/0122862 | A1 * | 4/2022 | Chishima | H10P 72/0604 |

FOREIGN PATENT DOCUMENTS

| | | | | | |
|---|---|---|---|---|---|
| KR | 20180043891 | A * | 5/2018 | | G01J 9/0246 |
| WO | WO-2015103931 | A1 * | 7/2015 | | G01B 13/00 |

* cited by examiner

SURFACE MEASURING DEVICE, PROCESSING DEVICE, AND SURFACE MEASURING METHOD

CROSS-REFERENCE TO RELATED APPLICATIONS

This application is based on and claims priority under 35 USC 119 from Japanese Patent Application No. 2023-085617 filed on May 24, 2023, the contents of which are incorporated herein by reference.

TECHNICAL FIELD

The present disclosure relates to a surface measuring device, a processing device, and a surface measuring method.

BACKGROUND ART

Patent Literature 1 discloses a method of scanning a surface of a measurement object with a contact or non-contact probe to measure a shape of the surface. In this method, first, the measurement object is displaced with respect to a chromatic point sensor (CPS) so that the CPS scans the surface along a predetermined first direction along a horizontal direction. Next, the measurement object is displaced with respect to the CPS at a predetermined feed pitch along a second direction that is along the horizontal direction and intersects the first direction. Thereafter, the steps are repeated. In this manner, the CPS scans the entire surface in a meandering manner, thereby acquiring a surface shape of the entire surface.

CITATION LIST

Patent Literature

Patent Literature 1: JP2019-045372A

SUMMARY

The present disclosure describes a surface measuring device, a processing device, and a surface measuring method that can measure a surface shape of a measurement object at a higher speed.

An example of a surface measuring device includes: a stage configured to allow a measurement object to be placed; a sensor unit disposed above the stage and configured to be movable relative to the stage; a supply unit configured to supply a gas to the sensor unit; and a control unit. The sensor unit includes first to N-th air sensors each configured to measure a flow rate of the gas supplied from the supply unit when the gas flows through an internal flow path, where N being a natural number of 2 or more, a base portion configured to hold the first to N-th air sensors arranged in a row in a first direction along a horizontal direction, and first to N-th nozzles communicating with the internal flow paths of the first to N-th air sensors respectively and each provided with a blow-out hole opened toward the stage. The control unit is configured to execute first processing of operating the supply unit such that the gas that has flowed through the internal flow paths is blown downward from the blow-out holes of the first to N-th nozzles, second processing of operating at least one of the stage and the sensor unit such that the sensor unit scans a surface of the measurement object during operation of the supply unit by the first processing, and third processing of calculating a separation distance between each of the first to N-th nozzles and the surface of the measurement object based on a flow rate of the gas measured in each of the first to N-th air sensors during scanning of the sensor unit by the second processing.

According to the surface measuring device, the processing device, and the surface measuring method of the present disclosure, it is possible to measure a surface shape of a measurement object at a higher speed.

DESCRIPTION OF EMBODIMENTS

Figure 1:
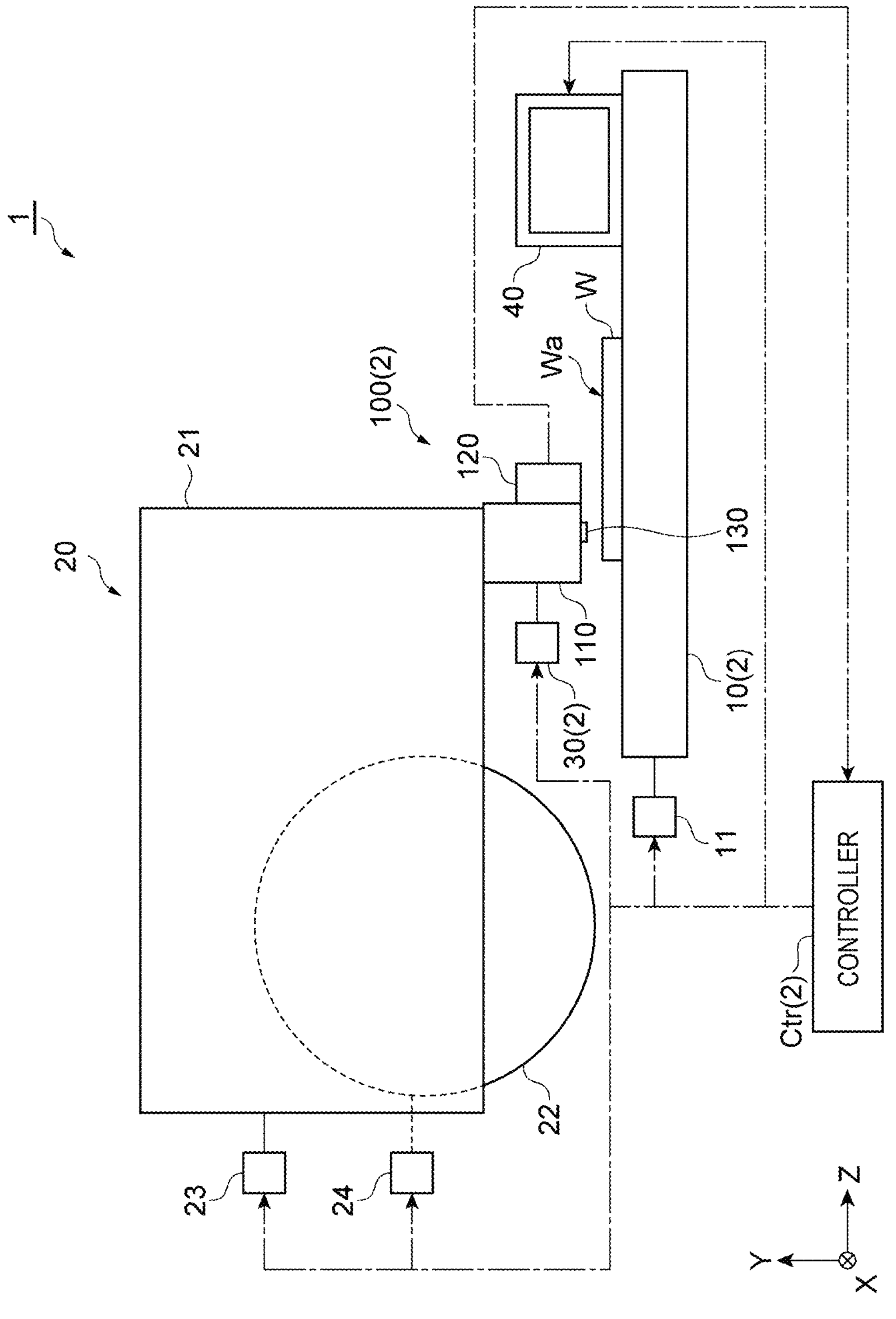
FIG. 1 is a side view schematically showing an example of a processing device.

In the following description, the same elements or elements having the same functions are denoted by the same reference numerals, and redundant description thereof is omitted. In the present description, when referring to “upper”, “lower”, “right”, or “left” in a figure, the direction of the symbol in the figure is used as a reference.

In the drawings, an orthogonal coordinate system defined by an X-axis, a Y-axis, and a Z-axis may be shown. In the orthogonal coordinate system, the Y-axis extends vertically upward, the X-axis extends in the horizontal direction so as to be orthogonal to the Y-axis, and the Z-axis extends in the horizontal direction so as to be orthogonal to both the X-axis and the Y-axis.

Configuration of Processing Device

A processing device 1 will be described with reference to FIGS. 1 to 4. As shown in FIG. 1, the processing device 1 has a function of processing a measurement object W. The measurement object W may be, for example, a metal member or a non-metal member.

As shown in FIG. 1, the processing device 1 includes a stage 10, a processing unit 20, a sensor unit 100, a supply unit 30, a display 40 (display unit), and a controller Ctr (control unit). In order to reduce scattering of dust generated during processing of the measurement object W, the processing device 1 may further include a housing (not shown) configured to accommodate a part or all of the units. A surface measuring device 2 may include at least the stage 10, the sensor unit 100, the supply unit 30, and the controller Ctr in the processing device 1.

The stage 10 is configured to attract and hold the measurement object W placed on an upper surface (placing surface). The stage 10 may be, for example, a magnet chuck or a vacuum chuck. When the stage 10 is a magnet chuck, a plurality of magnetic bodies may be exposed on a surface of the stage 10. The plurality of magnetic bodies may be arranged on the surface of the stage 10 such that N poles and S poles are alternately arranged. The stage 10 may hold at least one measurement object W or a plurality of measurement objects W.

An actuator 11 is connected to the stage 10. The actuator 11 may be configured to displace the stage 10 in a horizontal plane along the X-axis and the Z-axis based on an instruction signal from the controller Ctr. The actuator 11 may be, for example, an electric motor combined with a linear motion mechanism (a ball screw, a linear motion guide bearing, or the like).

The processing unit 20 has a function of processing the measurement object W so that the measurement object W has a predetermined shape. The processing unit 20 may be disposed above the stage 10. The processing unit 20 includes a holding portion 21, a tool 22, and actuators 23 and 24.

The holding portion 21 rotatably holds the tool 22. The holding portion 21 holds the sensor unit 100. As shown in FIG. 1, the holding portion 21 may hold the tool 22 and/or the sensor unit 100 such that the tool 22 and/or the sensor unit 100 protrudes downward from a lower portion of the holding portion 21.

The tool 22 is configured to process the measurement object W while being in contact with the measurement object W. For example, when the processing device 1 is a grinding device, the tool 22 may be a grindstone for grinding the measurement object W. The tool 22 may have, for example, a cylindrical shape or a circular plate shape. In this case, the processing of the measurement object W may be performed by bringing a peripheral surface of the tool 22 into contact with the measurement object W, or the processing of the measurement object W may be performed by bringing an end surface of the tool 22 into contact with the measurement object W.

The actuator 23 may be configured to displace the processing unit 20 in an upper-lower direction along the Y-axis based on an instruction signal from the controller Ctr. The actuator 23 may be, for example, an electric motor combined with a linear motion mechanism (a ball screw, a linear motion guide bearing, or the like).

The actuator 24 may be configured to rotationally drive the tool 22 based on an instruction signal from the controller Ctr. The actuator 24 may be, for example, an electric motor.

The sensor unit 100 is configured to measure a surface state of the measurement object W placed on the stage 10. As described above, the sensor unit 100 is attached to the lower portion of the holding portion 21 of the processing unit 20. Therefore, as the stage 10 is operated by the actuator 11, the sensor unit 100 moves together with the processing unit 20 relative to the stage 10.

As shown in FIGS. 1 to 4, the sensor unit 100 includes a base portion 110, a plurality of air sensors 120, and a plurality of nozzles 130.

Figure 2:
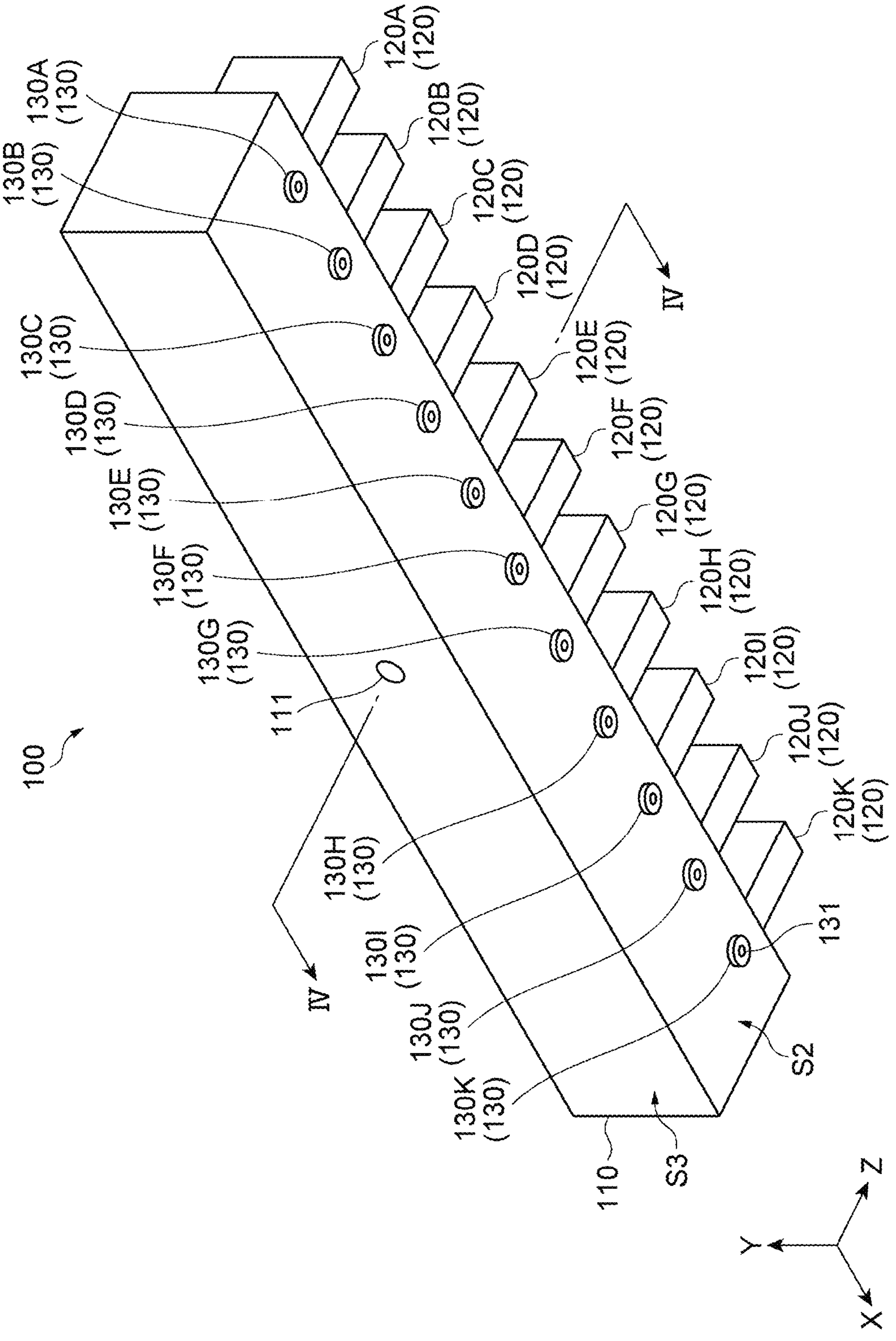
FIG. 2 is a perspective view schematically showing an example of a sensor unit as viewed from below.
Figure 3:
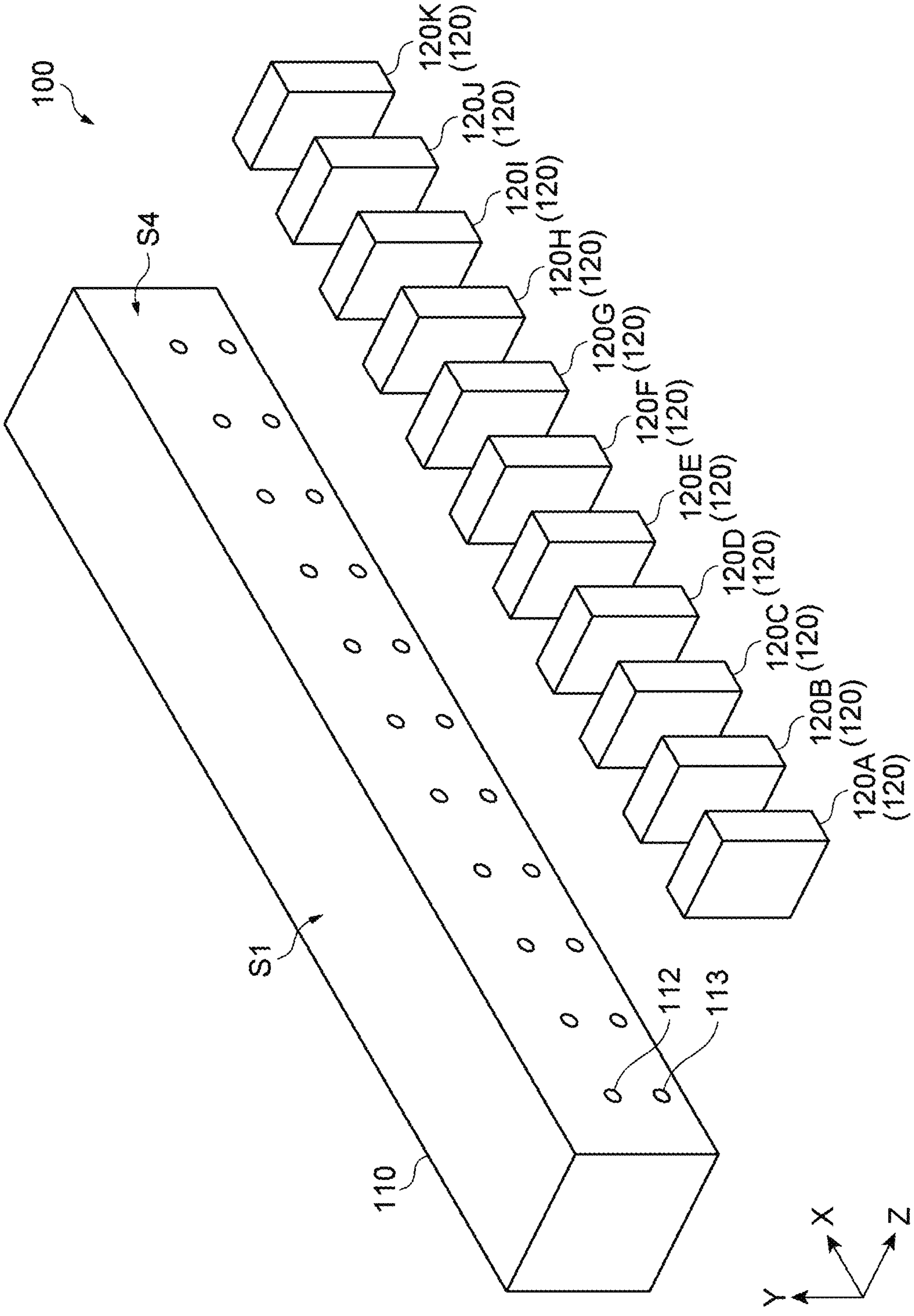
FIG. 3 is an exploded perspective view schematically showing the example of the sensor unit as viewed from above.
Figure 4:
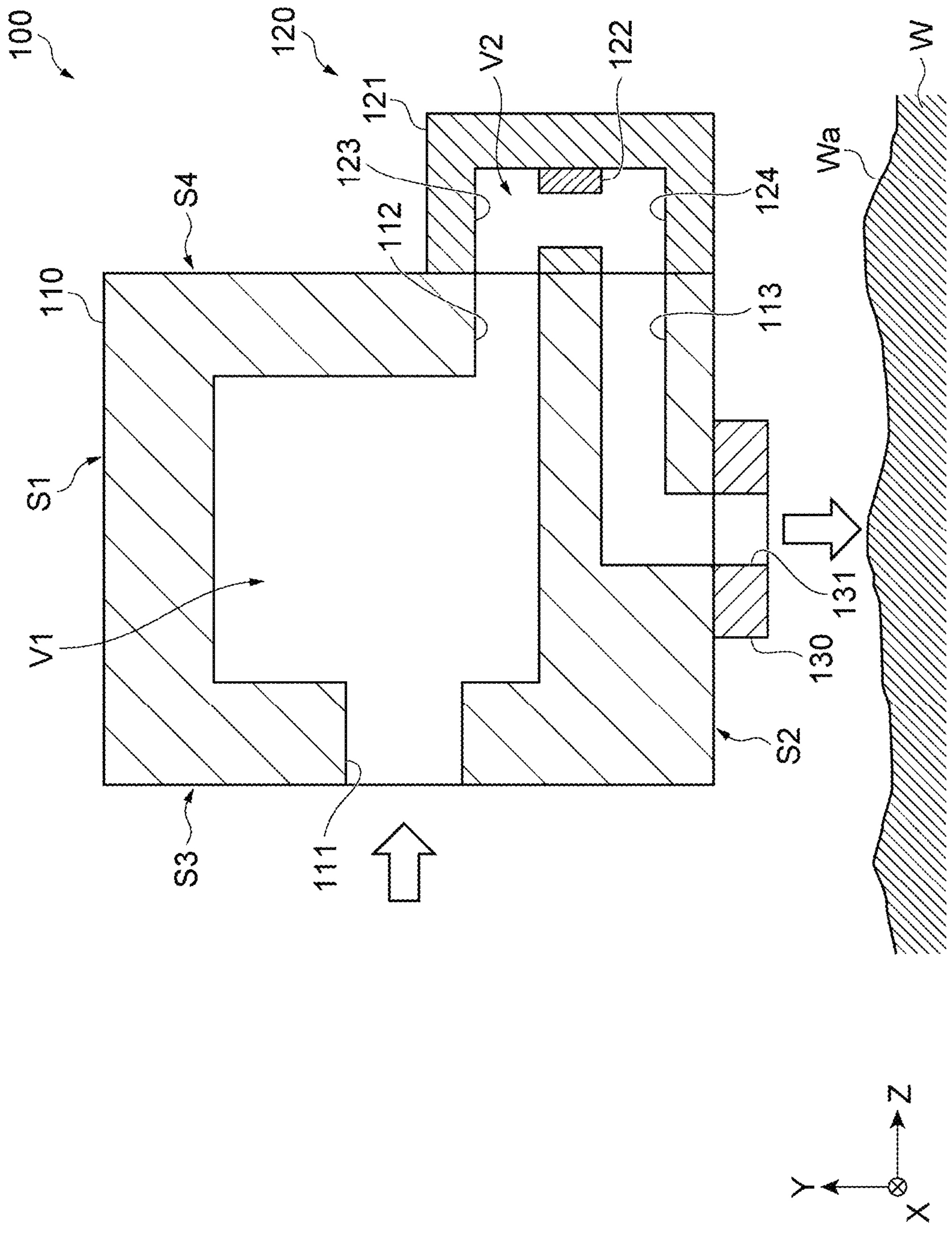
FIG. 4 is a cross-sectional view taken along a line IV-IV in FIG. 2.

The base portion 110 is configured to hold the plurality of air sensors 120 and the plurality of nozzles 130. In the example of FIGS. 1 to 4, the base portion 110 has a substantially rectangular parallelepiped shape extending in the X-direction. As shown in FIG. 4, the base portion 110 includes an internal space V1 provided therein. As shown in FIGS. 2 to 4, the base portion 110 includes an upper surface S1 and a lower surface S2 as a pair, and a pair of side surfaces S3 and S4.

The pair of upper surface S1 and lower surface S2 extends along the horizontal direction. The upper surface S1 is connected to the lower portion of the holding portion 21 of the processing unit 20. The lower surface S2 faces the upper surface of the stage 10 and a surface Wa of the measurement object W placed on the stage 10. The plurality of nozzles 130 are attached to the lower surface S2.

The pair of side surfaces S3 and S4 extend along a vertical direction. The side surfaces S3 and S4 both connect the upper surface S1 and the lower surface S2. The side surface S3 has an inflow hole 111 fluidly connected to the supply unit 30. The inflow hole 111 communicates with the internal space V1. As shown in FIG. 2, the inflow hole 111 may be disposed near the center of the side surface S3.

As shown in FIGS. 1 to 4, the plurality of air sensors 120 are attached to the side surface S4. The side surface S4 is provided with pairs of connection holes 112 and 113 at positions corresponding to the plurality of air sensors 120. As shown in FIG. 4, each of the plurality of connection holes 113 extends inside the base portion 110 from the side surface S4 to the lower surface S2.

As shown in FIGS. 2 and 3, the plurality of air sensors 120 are disposed on the side surface S4 so as to be arranged along a first direction (direction along the X-axis) along the horizontal direction. The number of the plurality of air sensors 120 may be two or more. That is, it can be said that the sensor unit 100 includes a first to N-th air sensors 120 (N is a natural number of 2 or more). In the example of FIGS. 1 to 4, the sensor unit 100 includes a first air sensor 120A, a second air sensor 120B, . . . , and an eleventh air sensor 120K (see FIG. 2).

As shown in FIG. 4, the plurality of air sensors 120 each include a housing 121 and a sensor main body 122. The housing 121 includes an internal flow path V2 provided therein. An inlet portion 123 and an outlet portion 124 are opened in a side surface of the housing 121 that faces the base portion 110. The inlet portion 123 and the outlet portion 124 communicate with the internal flow path V2. In a state where the air sensor 120 is attached to the base portion 110, the inlet portion 123 is fluidly connected to the corresponding connection hole 112, and the outlet portion 124 is fluidly connected to the corresponding connection hole 113.

The sensor main body 122 is attached within the housing 121 so as to be positioned in the internal flow path V2 of the housing 121. The sensor main body 122 is configured to measure a flow rate of a gas flowing through the internal flow path V2. The sensor main body 122 is configured to transmit data of the measured flow rate of the gas to the controller Ctr.

As shown in FIGS. 2 and 3, the plurality of nozzles 130 are arranged in the first direction (direction along the X-axis) along the horizontal direction so as to be positioned corresponding to the plurality of air sensors 120. That is, the number of the plurality of nozzles 130 is the same as the number of the plurality of air sensors 120. In the example of FIGS. 1 to 4, the sensor unit 100 includes a first nozzle 130A, a second nozzle 130B, . . . , and an eleventh nozzle 130K (see FIG. 2).

As shown in FIGS. 3 and 4, each of the plurality of nozzles 130 includes a blow-out hole 131 opened toward the upper surface of the stage 10. A distance between the blow-out holes 131 of the adjacent nozzles 130 may be set according to the accuracy required in the measurement of the measurement object W, and may be, for example, about 10 μm.

As shown in FIG. 4, the blow-out hole 131 communicates with an opening provided in the lower surface S2 of the base portion 110 among the connection holes 113. Accordingly, the inflow hole 111, the internal space V1, the plurality of connection holes 112, the plurality of internal flow paths V2, the plurality of connection holes 113, and the blow-out holes 131 communicate in this order.

The supply unit 30 is configured to supply a gas to the sensor unit 100. Specifically, the supply unit 30 is configured to supply a predetermined flow rate of gas to the internal space V1 of the base portion 110 through the inflow hole 111 based on an instruction signal from the controller Ctr. The supply unit 30 may be, for example, a blower or a pump. The gas supplied to the sensor unit 100 by the supply unit 30 may be, for example, air or an inert gas.

The display 40 has a function of displaying various information on a screen based on an instruction signal from the controller Ctr. The information displayed on the display 40 may be the surface shape of the measurement object W measured by the sensor unit 100, a size of the measurement object W, a position (origin coordinates) of the measurement object W, or a processing condition of the measurement object W.

Details of Controller

Figure 5:
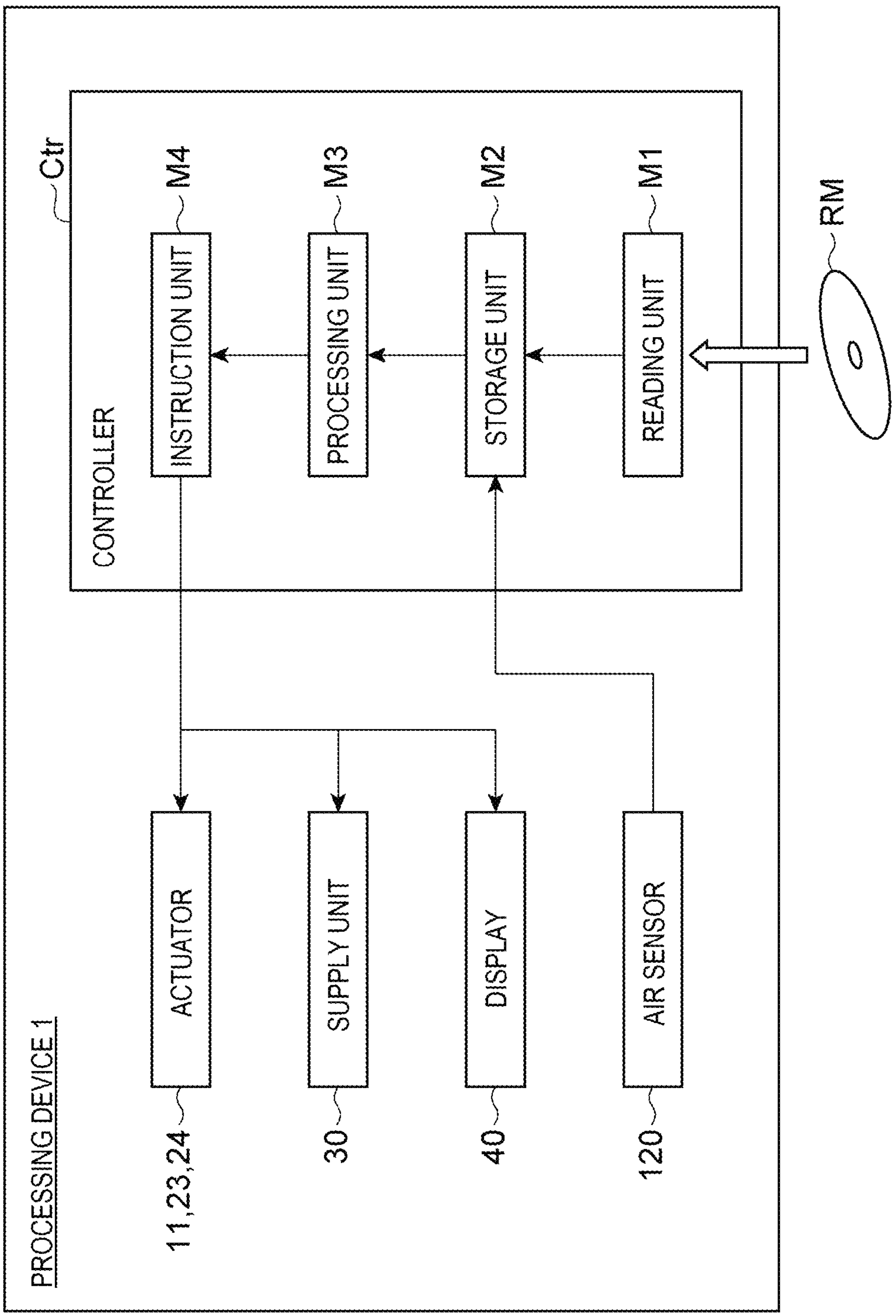
FIG. 5 is a block diagram showing main parts of the processing device.

As shown in FIG. 5, the controller Ctr includes a reading unit M1, a storage unit M2, a processing unit M3, and an instruction unit M4 as functional modules. This functional modules are simply functions of the controller Ctr divided into multiple modules for convenience, and do not necessarily mean that the hardware constituting the controller Ctr is divided into such modules. Each functional module is not limited to one implemented by executing a program. For example, each functional module may be implemented by a dedicated electric circuit (for example, a logic circuit) or an integrated circuit (application specific integrated circuit (ASIC)) in which the dedicated electric circuit is integrated.

The reading unit M1 is configured to read a program from a computer-readable recording medium RM. The recording medium RM records a program for operating each unit of the processing device 1. The recording medium RM may be, for example, a semi-conductor memory, an optical recording disk, a magnetic recording disk, a magneto-optical recording disk, or the like. Hereinafter, each unit of the processing device 1 may include the actuators 11, 23, and 24, the supply unit 30, and the display 40.

The storage unit M2 is configured to store various data. The storage unit M2 may store, for example, a program read from the recording medium RM by the reading unit M1, setting data input by an operator via an external input device (not shown), and the like. The storage unit M2 may store, for example, data of the flow rate of the gas measured by the air sensor 120. Although described in detail later, the storage unit M2 may store a model representing a relationship between the flow rate of the gas measured by the air sensor 120 and a separation distance between the nozzle 130 and a surface 141 (described later) of a reference block 140.

The processing unit M3 is configured to process various data. The processing unit M3 may generate a signal for operating each unit of the processing device 1 based on various data stored in the storage unit M2, for example. The processing unit M3 may calculate the separation distance between each nozzle 130 and the surface Wa of the measurement object W based on data of the flow rate of the gas measured by the air sensor 120.

Here, as shown in FIG. 4, when a gas is blown out from the blow-out hole 131 of the nozzle 130 toward the surface Wa of the measurement object W, the difficulty (impedance) of the flow of the gas changes according to the separation distance. That is, when the separation distance is small, a space between the blow-out hole 131 of the nozzle 130 and the front surface Wa of the measurement object W is narrow, and the gas blown out from the blow-out hole 131 immediately collides with the front surface Wa, and thus the gas hardly flows. On the other hand, when the separation distance is large, a space between the blow-out hole 131 of the nozzle 130 and the front surface Wa of the measurement object W is wide, and the gas blown out from the blow-out hole 131 tends to spread into a surrounding space before colliding with the front surface Wa, and thus the gas flows easily. Therefore, the magnitude of the separation distance can be calculated by the air sensor 120 measuring the flow rate of the gas flowing through the internal flow path V2. In the sensor main body 122, the measured flow rate of the gas may be output as a voltage value, and data of the voltage value may be transmitted to the controller Ctr. That is, the controller Ctr may execute a processing of converting the voltage value into a flow rate after receiving the data of the voltage value from the sensor main body 122.

The instruction unit M4 is configured to transmit an operation signal generated in the processing unit M3 to each unit of the processing device 1.

Figure 6:
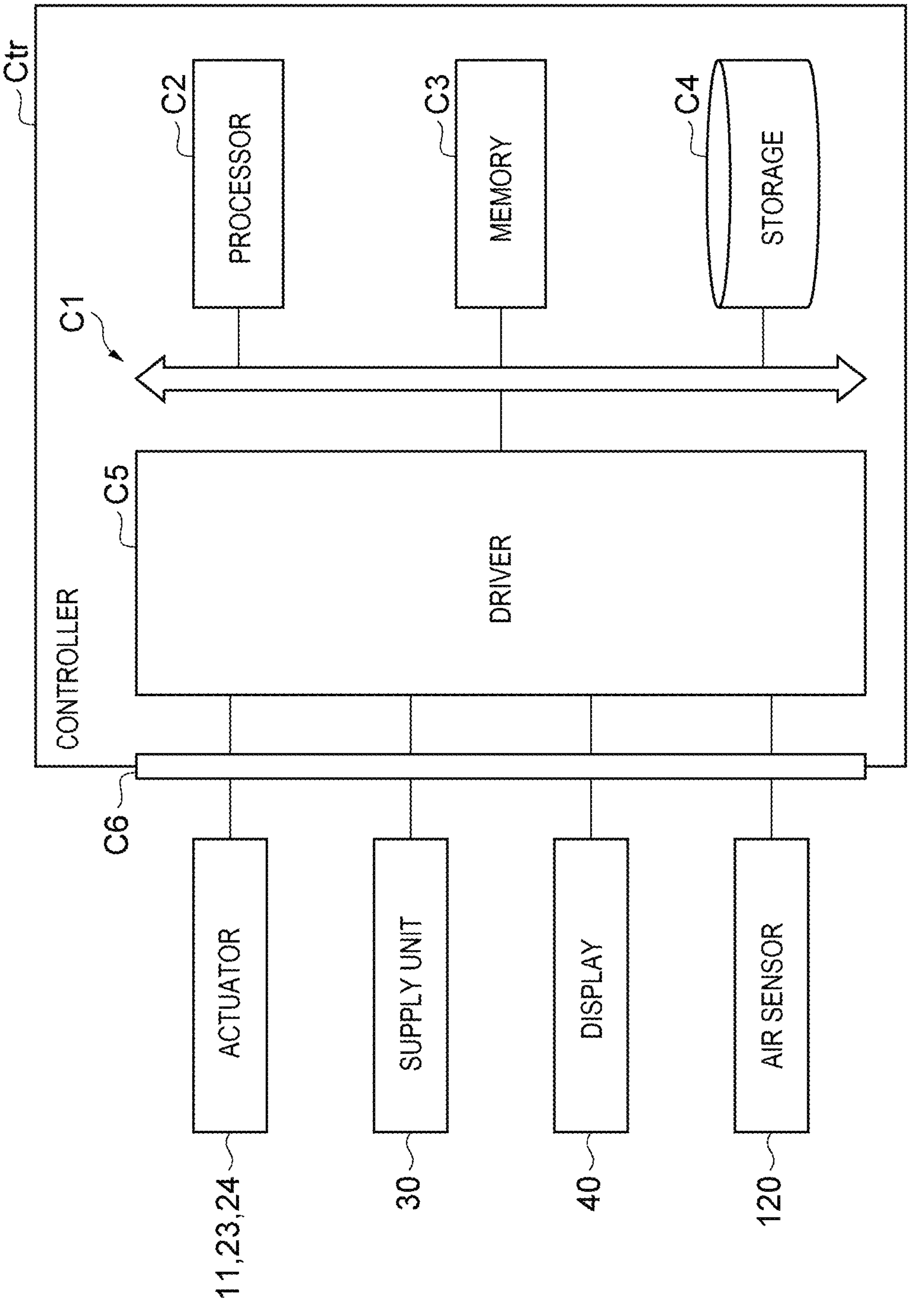
FIG. 6 is a schematic diagram showing an example of a hardware configuration of a controller.

The hardware of the controller Ctr may include, for example, one or more control computers. As shown in FIG. 6, the controller Ctr may include a circuit C1 as a hardware configuration. The circuit C1 may include an electric circuit element (circuitry). The circuit C1 may include, for example, a processor C2, a memory C3, a storage C4, a driver C5, and an input and output port C6.

The processor C2 may be configured to implement the above-described functional modules by executing a program in cooperation with at least one of the memory C3 and the storage C4 and executing input and output of a signal via the input and output port C6. The memory C3 and the storage C4 may function as the storage unit M2. The driver C5 may be a circuit configured to drive each unit of the processing device 1. The input and output port C6 may be configured to relay input and output of signals between the driver C5 and each unit of the processing device 1.

The processing device 1 may include one controller Ctr or a controller group (control unit) including a plurality of controllers Ctr. When the processing device 1 includes a controller group, each of the above-described functional modules may be implemented by one controller Ctr, or may be implemented by a combination of two or more controllers Ctr. When the controller Ctr is configured by a plurality of computers (the circuit C1), each of the above-described functional modules may be implemented by one computer (the circuit C1). Alternatively, each of the above-described functional modules may be implemented by a combination of two or more computers (circuit C1). The controller Ctr may include a plurality of processors C2. In this case, each of the above-described functional modules may be implemented by one processor C2, or may be implemented by a combination of two or more processors C2.

Method of Generating Model

Figure 7A:
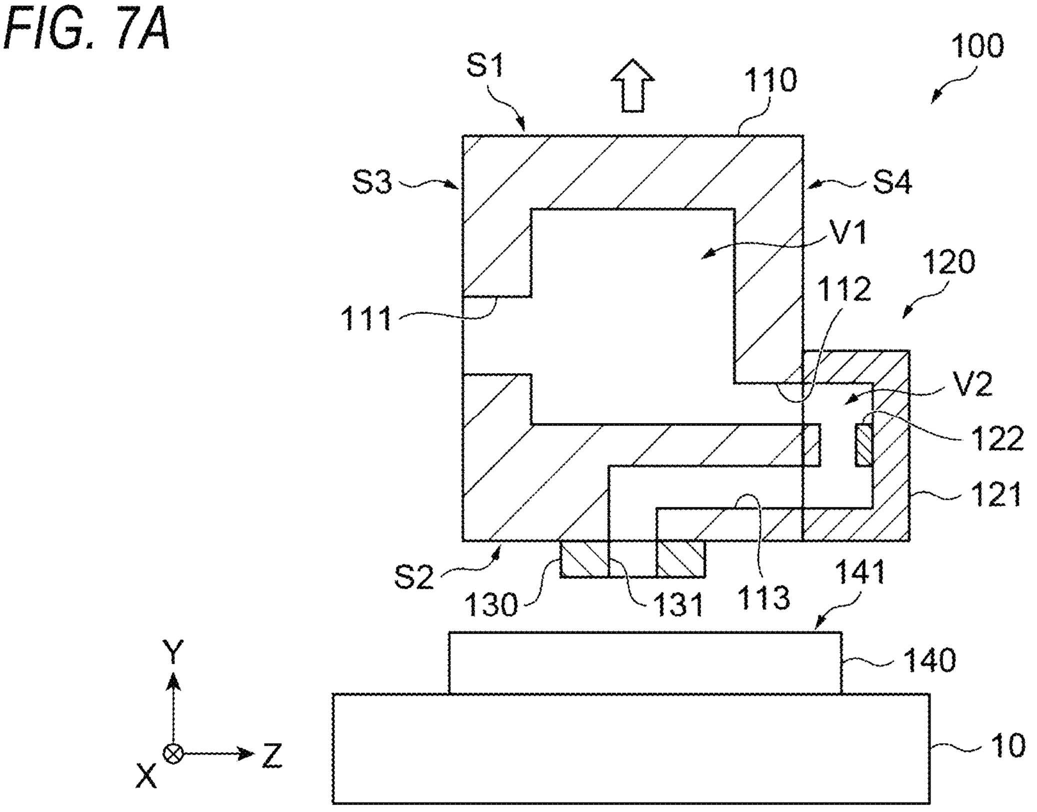
FIG. 7A is a cross-sectional view of a surface measuring device illustrating a procedure for generating a model of an air sensor.

Next, a method of generating a model (characteristics) of the air sensor 120 will be described with reference to FIGS. 7A to 8. First, as shown in FIG. 7A, the reference block 140 is placed on the stage 10. Next, the controller Ctr controls the actuator 23 to lower the sensor unit 100 together with the holding portion 21 until the nozzle 130 comes into contact with the surface 141 of the reference block 140.

Next, the controller Ctr controls the actuator 23 to raise the sensor unit 100 together with the holding portion 21 such that the nozzle 130 is located 10 μm above the surface 141 of the reference block 140. In this state, the controller Ctr controls the supply unit 30 to supply a gas to the sensor unit 100. As a result, the gas is blown from the blow-out hole 131 of the nozzle 130 onto the surface 141 of the reference block 140. At this time, the air sensor 120 continues to measure a flow rate of the gas for a predetermined time.

Next, after the predetermined time has elapsed, the controller Ctr controls the actuator 23 while continuing the supply of the gas from the supply unit 30 to the sensor unit 100. That is, the sensor unit 100 is raised together with the holding portion 21 so that the nozzle 130 is located further upward by 10 μm (the nozzle 130 is located 20 μm above the surface 141 of the reference block 140). Then, similarly to the above, the air sensor 120 continues to measure the flow rate of the gas for a predetermined time. Thereafter, similarly, the measurement of the flow rate of the gas is repeated a predetermined number of times using the air sensor 120 while raising the nozzle 130 by 10 μm each time. The nozzle 130 is raised by 10 μm each time as an example, and the amount may be increased or decreased depending to the accuracy required for the model.

Figure 7B:
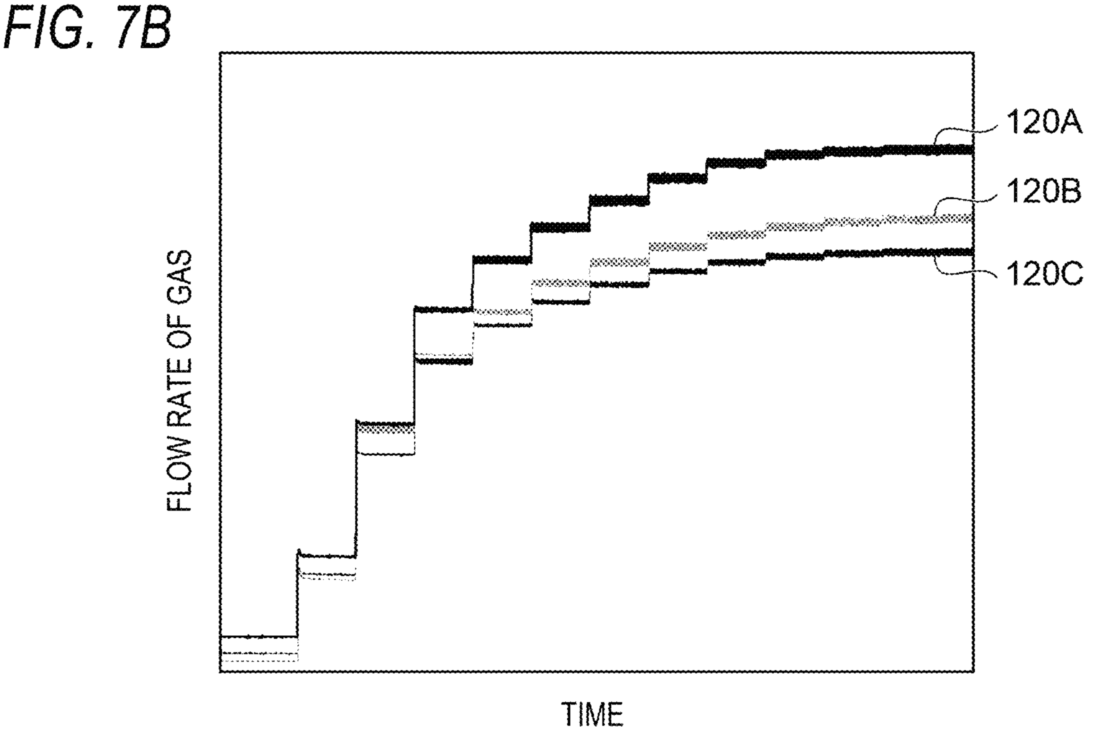
FIG. 7B is a graph illustrating an example of a change in gas flow rate for each air sensor when a separation distance between a nozzle of the air sensor and a surface of a reference block is changed every predetermined time period.
Figure 8:
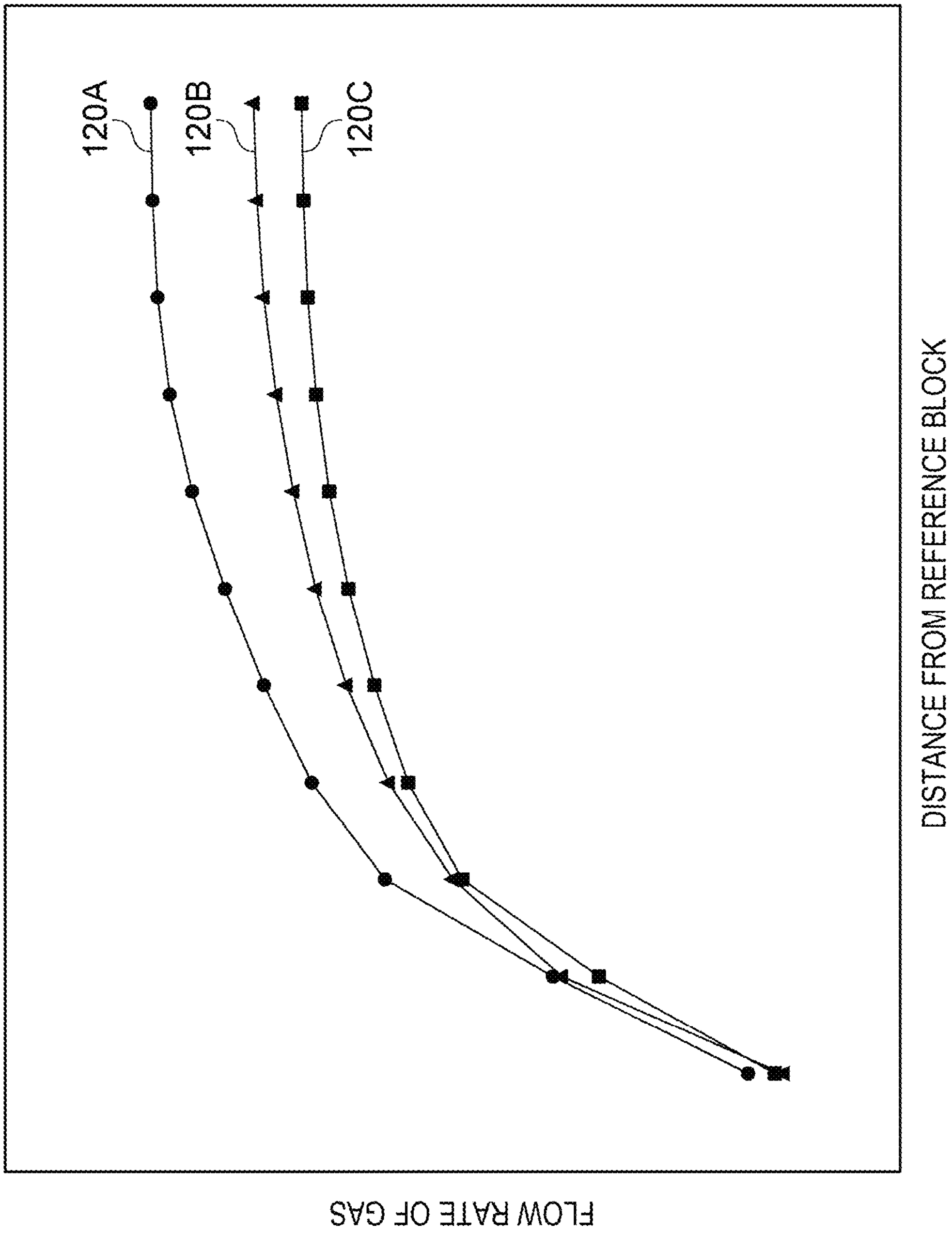
FIG. 8 is a graph showing an example of a model (characteristics) of the air sensor.

The measurement results obtained in this manner are shown in FIG. 7B. As described above, since the nozzle 130 is raised every time the predetermined time elapses, as shown in FIG. 7B, the flow rate of the gas measured by the air sensor 120 increases stepwise as time elapses. FIG. 7B illustrates an example of measurement results of three air sensors 120A to 120C as an example.

Next, an average value of data on the flow rate of the gas when the nozzles 130 are located at 10 μm is calculated. An average value of data on the flow rate is also similarly calculated for each height position of the nozzle 130 at 20 μm or more. The plurality of average values calculated in this manner are plotted on a graph in which the horizontal axis represents the height position of the nozzle 130 from the surface 141 of the reference block 140, and the vertical axis represents the flow rate of the gas, as shown in FIG. 8. Next, an approximate line is calculated based on the plotted data. Accordingly, the function of the flow rate of the gas with respect to the height position of the nozzle 130 is represented by the approximate line, and the approximate line is obtained as a model. Here, the approximate line may be, for example, a polygonal line obtained by connecting the plotted data with a straight line, a linear approximation, or a polynomial approximation.

One model obtained in this manner may be applied to all the air sensors 120. Alternatively, if the measurement results for the air sensors 120 vary widely as in the air sensors 120A to 120C shown in FIG. 7B, an individual model may be generated for each air sensor 120 in the above-described procedure (see FIG. 8).

Surface Measuring Method of Measurement Object

Figure 9:
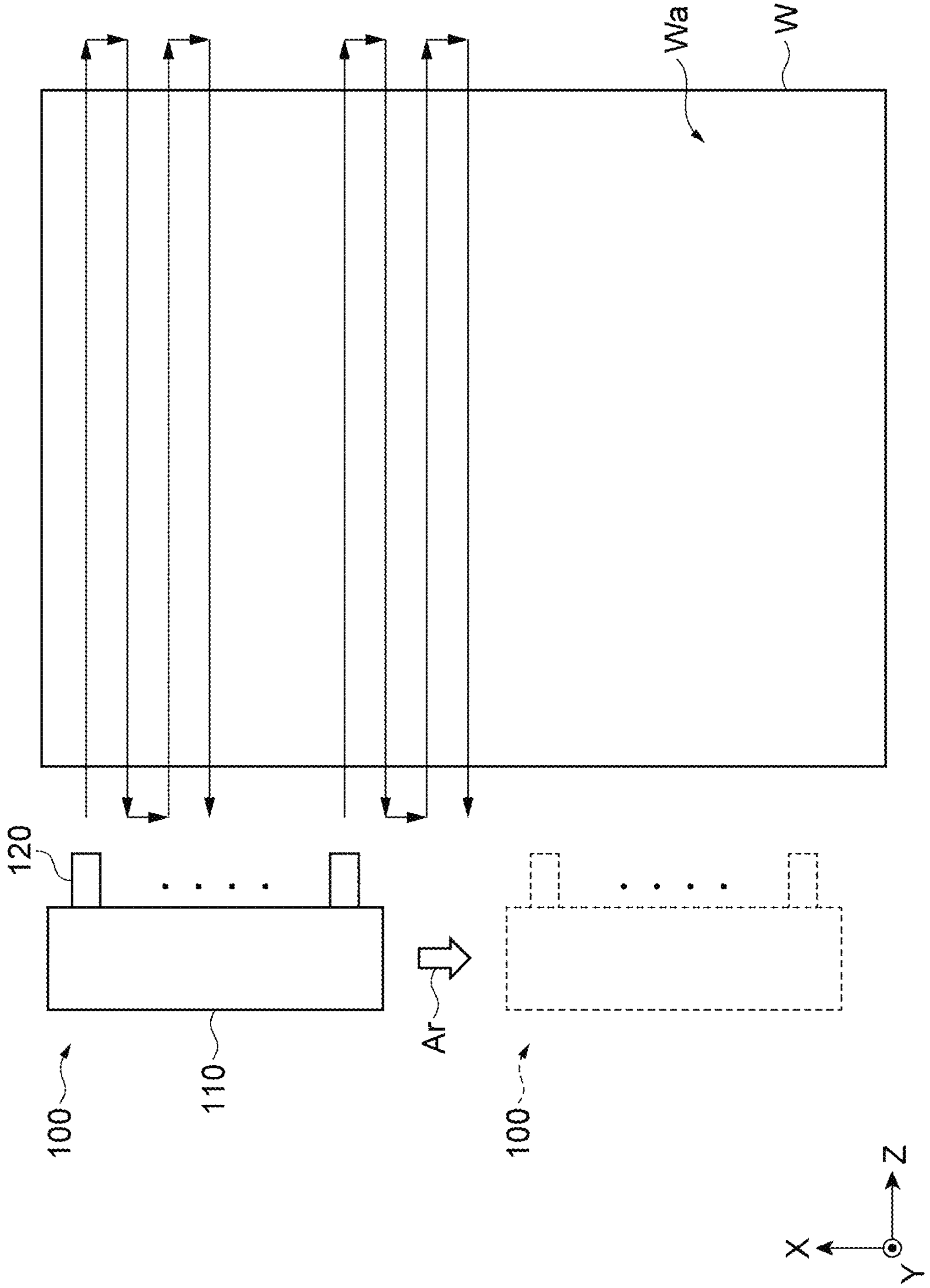
FIG. 9 is a top view showing an example of movement of the surface measuring device with respect to a measurement object.
Figure 10A:
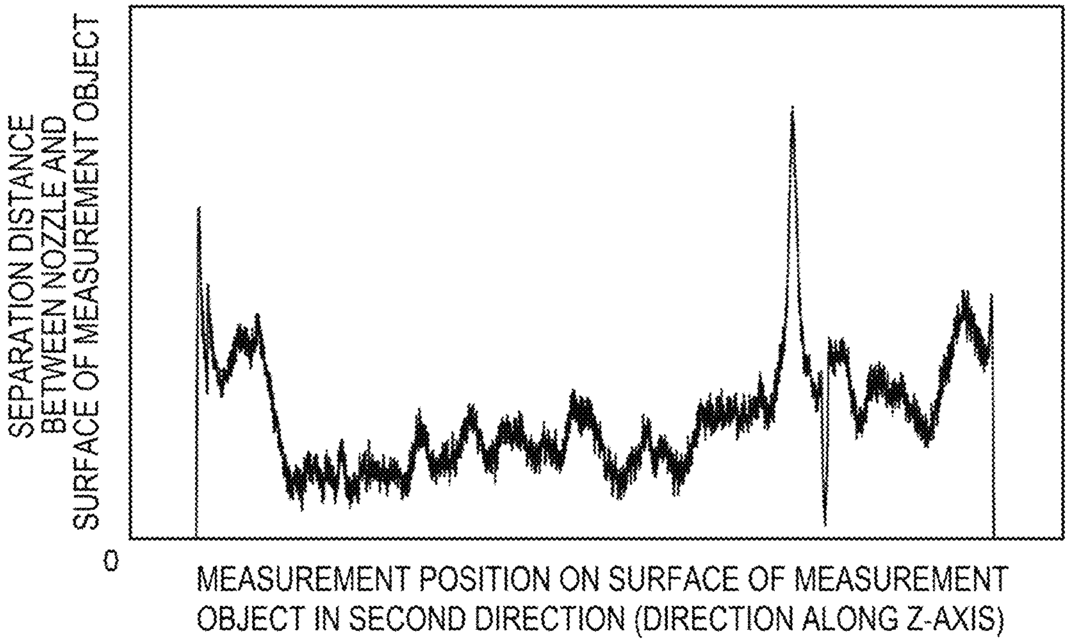
FIG. 10A is an example of data showing a state of a surface shape of a measurement object measured when one air sensor scans a surface of the measurement object once from one side edge to the other side edge with a horizontal axis indicating a position of the air sensor in a Z direction and a vertical axis indicating a relative position with respect to a height of the surface at a reference position.
Figure 10B:
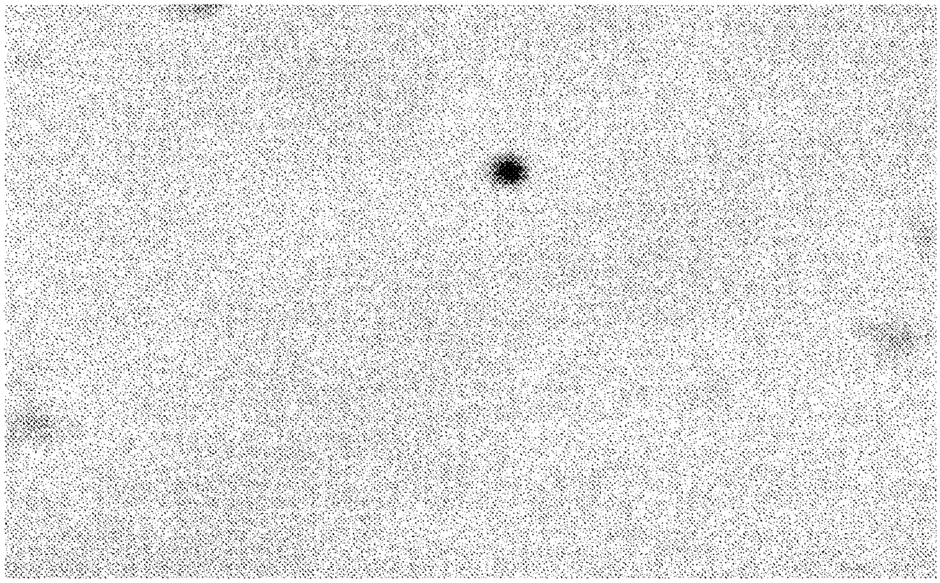
FIG. 10B is an example of data secondarily showing a state of the surface shape of the measurement object when the entire surface of the measurement object is scanned by the surface measuring device using shading.

Next, a method of measuring the surface Wa of the measurement object W will be described with reference to FIGS. 9 to 10B.

First, the measurement object W is placed on the stage 10 such that the front surface Wa of the measurement object W faces upward. Next, the controller Ctr instructs the actuator 23 to adjust the height position of the sensor unit 100 such that the nozzle 130 is at a predetermined height from a reference position of the surface Wa of the measurement object W. Here, the reference position may be, for example, any position at which the height position of the surface Wa is known by prior measurement or the like.

Next, the controller Ctr controls the supply unit 30 to supply a gas to the sensor unit 100. Accordingly, the gas is blown downward from the blow-out holes 131 of the nozzles 130 (first processing, first step).

Next, in a state where the gas is blown out from the blow-out holes 131 of the nozzles 130, the controller Ctr instructs the actuator 11 to operate the stage 10 so that the sensor unit 100 scans the front surface Wa of the measurement object W (second processing, second step). Specifically, first, as shown in FIG. 9, the sensor unit 100 is caused to scan with the nozzles 130 moving in a second direction (direction along the Z-axis) that is along the horizontal direction and intersects the first direction, from one side edge to beyond the other side edge of the measurement object W. That is, the gas blown out from the blow-out hole 131 is blown against the surface Wa of the measurement object W from the one side edge to beyond the other side edge of the measurement object W.

At this time, along with the scanning of the sensor unit 100, the air sensor 120 measures the flow rate of the gas corresponding to the separation distance between the nozzles 130 and the surface Wa of the measurement object W. The controller Ctr calculates the separation distance between the nozzles 130 and the surface Wa of the measurement object W based on data of the flow rate of the gas measured by the air sensor 120 (third processing, third step). The controller Ctr may calculate the separation distance by substituting the data of the flow rate of the gas measured by each air sensor 120 into a model acquired in advance. When a model is acquired for each air sensor 120, the controller Ctr may calculate a separation distance between each nozzle 130 and the surface Wa of the measurement object W by substituting data of the flow rate of the gas measured by each air sensor 120 into the corresponding model. FIG. 10A shows an example of the calculation result of the separation distance based on the data of the flow rate of the gas measured by one air sensor 120 when the sensor unit 100 moves from the one side edge to beyond the other side edge of the measurement object W.

Subsequently, the controller Ctr instructs the actuator 11 to operate the stage 10 at a predetermined feed pitch in the first direction (direction along the X-axis). For example, the feed pitch may be set to be smaller than a distance between the blow-out holes 131 of adjacent nozzles 130 (an interval between adjacent air sensors 120). The feed pitch may be set to, for example, about ½ to ⅒ of the distance between the blow-out holes 131 of adjacent nozzles 130. The number of times the sensor unit 100 moves from the one side edge to the other side edge of the measurement object W or vice versa in the second direction (direction along the Z-axis) may be set according to the feed pitch. For example, when the feed pitch is set to ½ of the distance between the blow-out holes 131 of adjacent nozzles 130, the number of times of movement in the second direction (direction along the Z-axis) may be set to two. When the feed pitch is set to 1/10 of the distance between the blow-out holes 131 of adjacent nozzles 130, the number of times of movement in the second direction (direction along the Z-axis) may be set to 10.

Subsequently, the sensor unit 100 is caused to scan with the blow-out hole 131 of the nozzle 130 moving in the second direction (direction along the Z-axis) from the other side edge to beyond the one side edge of the measurement object W. By repeating the above operation, the sensor unit 100 scans the surface Wa of the measurement object W a predetermined number of times in the second direction (direction along the Z-axis), and moves at the feed pitch for each scanning in the second direction (direction along the Z-axis). In other words, the sensor unit 100 moves on the surface Wa of the measurement object W while meandering (turning to the left and right) with respect to the measurement object W. The meandering movement of the sensor unit 100 relative to the measurement object W may be referred to as a scanning operation of the sensor unit 100.

As described above, when all regions to be measured (for example, a part or all of the surface Wa) on the surface Wa of the measurement object W are measured, measurement processing of the surface Wa of the measurement object W is completed. When the regions to be measured on the surface Wa of the measurement object W are not entirely measured by the above processing, the following processing may be performed. That is, the controller Ctr may instruct the actuator 11 to operate the stage 10 until the sensor unit 100 reaches a region (unscanned region) which is not scanned by the sensor unit 100 on the surface Wa of the measurement object W (see arrow Ar in FIG. 9). This operation of the stage 10 may be referred to as a shift operation of the sensor unit 100 in the sense of shifting the relative position of the sensor unit 100 to the unscanned region.

After the shift operation, the controller Ctr instructs the actuator 11 and the supply unit 30. Accordingly, in a state where the gas is blown downward from the blow-out holes 131 of the nozzles 130, the stage 10 operates again such that the sensor unit 100 scans the unscanned region on the surface Wa of the measurement object W. Thereafter, when there is an unscanned region on the surface Wa of the measurement object W, the scanning operation and the shift operation may be repeatedly executed.

When the measurement processing on the surface Wa of the measurement object W is completed, the controller Ctr may calculate a surface shape of the measurement object W based on the separation distance obtained in the above processing, and display the surface shape on the display 40 (fourth processing, fourth step). Specifically, the controller Ctr may convert each separation distance calculated by the controller Ctr into a height position of the surface Wa of the measurement object W. Next, the controller Ctr may display the size of the height position on the display 40 two-dimensionally or three-dimensionally according to the position of each air sensor 120. FIG. 10B shows an example of a two-dimensional image in which a position where the separation distance is small (a position where the height position of the surface Wa of the measurement object W is relatively high) is displayed in a dark gray color, and a position where the separation distance is large (a position where the height position of the surface Wa of the measurement object W is relatively low) is displayed in a light gray color.

Effects

According to the above example, the sensor unit 100 scans the front surface Wa while blowing a gas toward the front surface Wa of the measurement object W from the blow-out hole 131 of each nozzle 130. The separation distance (gap) between each nozzle 130 and the surface Wa is calculated based on the flow rate of the gas measured by each air sensor 120. Therefore, every time the sensor unit 100 scans the surface Wa, a plurality of pieces of data related to the surface shape of the measurement object W are acquired at once. Therefore, compared to a case where one air sensor 120 scans the entire surface of the measurement object W, the surface shape of the entire surface of the measurement object W can be measured at a higher speed. Further, according to the above example, the air sensor 120 is located upstream of the blow-out hole 131 of the nozzle 130. Therefore, when the flow rate of the gas blown out from the blow-out hole 131 changes as the separation distance between the nozzle 130 and the surface Wa of the measurement object W changes, the flow rate of the gas also immediately changes in an air sensor located on the upstream side and in the same flow path as the blow-out hole 131. That is, an extremely high response speed is obtained. Therefore, according to the above example, it is possible to measure the surface shape of the measurement object W at an extremely high speed.

According to the above example, by acquiring a model in advance, the separation distance between each air sensor 120 and the surface Wa of the measurement object W can be estimated immediately from the flow rate of the gas measured by each air sensor 120. Therefore, it is possible to accurately and immediately estimate each separation distance according to the flow rate of the gas in each air sensor 120 that changes every moment during the measurement of the surface shape of the measurement object W by the sensor unit 100.

According to the above example, a model can be acquired in advance for each air sensor 120. Therefore, even in a case where the characteristics are slightly different for each machine body of the air sensor 120 due to a manufacturing error or the like, it is possible to more accurately calculate the separation distance between each air sensor 120 and the surface Wa of the measurement object W using the model corresponding to each air sensor 120.

According to the above example, the internal space V1 in the base portion 110 communicates with the inlet portion 123 of each air sensor 120 via the connection hole 112 of the base portion 110. Further, according to the above example, the outlet portion 124 of each air sensor 120 communicates with the blow-out hole 131 of the corresponding nozzle 130 via the connection hole 113 of the base portion 110. Therefore, a total length of a flow path from the base portion 110 to the blow-out hole 131 of each nozzle 130 can be further shortened. Accordingly, the response speed of the flow rate of the gas in the air sensor 120 with respect to a change in the separation distance between the nozzle 130 and the surface Wa of the measurement object W becomes faster. As a result, the surface shape of the measurement object W can be measured at a higher speed.

According to the above example, the shift operation of the sensor unit 100 can be performed. Therefore, the sensor unit 100 scans a region on the surface Wa of the measurement object W corresponding to a position between adjacent nozzles 130 at a fine feed pitch. On the other hand, regarding an unscanned region on the surface Wa of the measurement object W, the sensor unit 100 can perform the scanning operation after the sensor unit 100 has moved significantly in the second direction. Accordingly, the entire surface of the measurement object W can be efficiently measured by one sensor unit 100.

According to the above example, the surface shape of the measurement object W based on the separation distance calculated by the controller Ctr is two-dimensionally or three-dimensionally displayed on the display 40 according to the position of each air sensor 120. Therefore, an operator can easily grasp the surface shape of the measurement object W visually.

According to the above example, the processing device 1 includes the surface measuring device 2, and the tool 22 and the sensor unit 100 are attached to the processing unit 20. Therefore, after the surface shape of the measurement object W is measured by the sensor unit 100, the measurement object W can be immediately machined by the tool 22 based on the measurement data. Therefore, it is not necessary to move the measurement object between the measurement processing of the surface shape of the measurement object W and processing on the measurement object W. Accordingly, it is not necessary to adjust a position of the measurement object W after the movement. As a result, a time from the measurement processing to the processing is shortened, so that productivity can be increased.

Modifications

The disclosure in this description should be considered to be illustrative and not restrictive in all respects. Various omissions, substitutions, or modifications may be made to the above examples without departing from the scope of the claims and the gist thereof.

(1) In the above example, the approximate line indicating the relationship between the separation distance between the nozzle 130 and the surface 141 of the reference block 140 and the flow rate of the gas blown onto the surface 141 from the blow-out hole 131 of the nozzle 130 is obtained as the model. However, for example, the flow rate of the gas from the supply unit 30 to the sensor unit 100, an opening area of the blow-out hole 131 of the nozzle 130, and the like may also be included as one element constituting the model.

Figure 11:
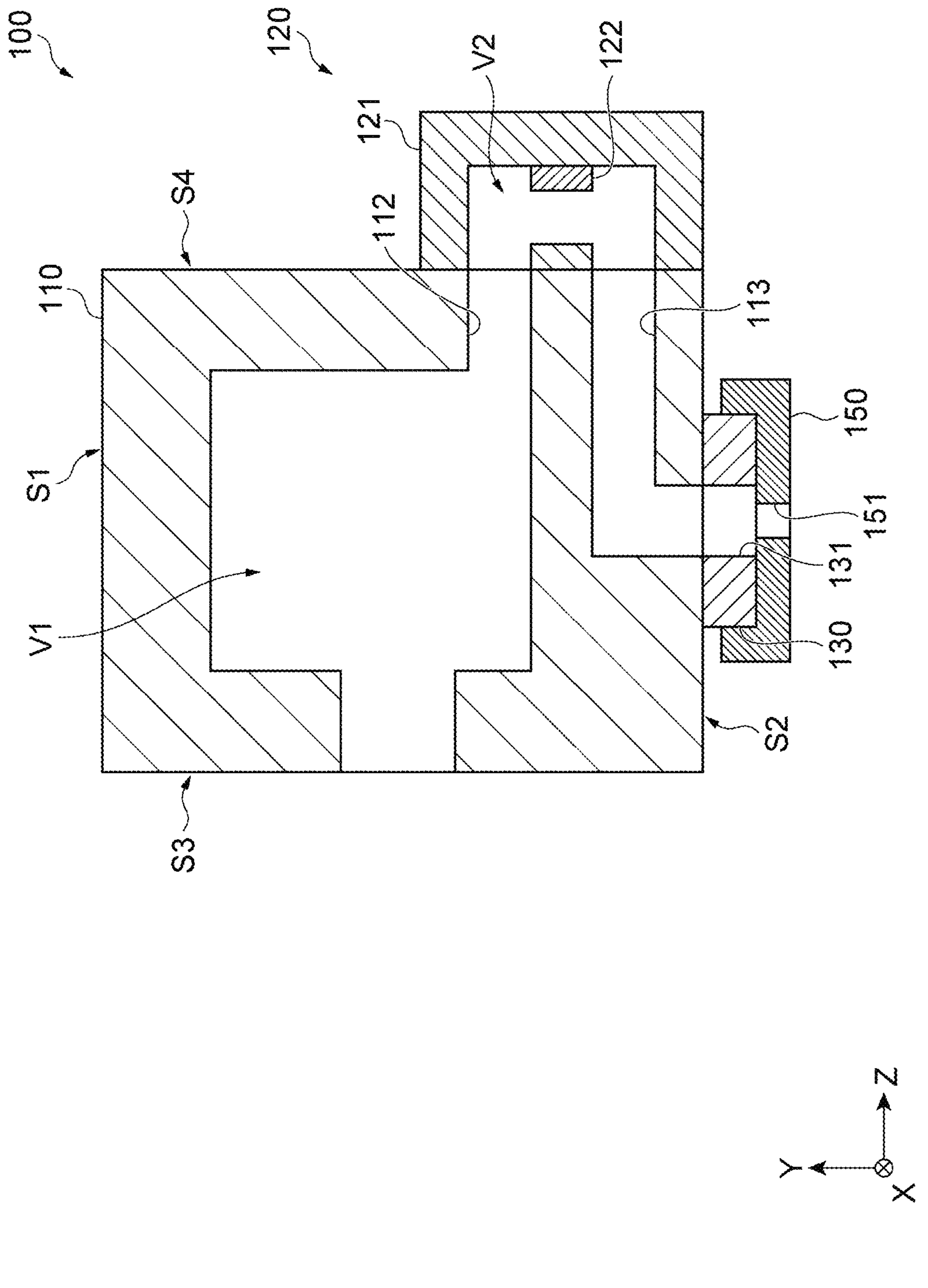
FIG. 11 is a cross-sectional view showing an example of the surface measuring device to which an attachment nozzle is attached.

(2) As shown in FIG. 11, the surface measuring device 2 may further include a plurality of attachment nozzles 150 configured to be detachably attached to the nozzles 130, respectively. The attachment nozzle 150 may have a recessed shape conforming to an outer shape of a part of a lower surface and a peripheral surface of the nozzle 130. The attachment nozzle 150 may be joined to the nozzle 130 by, for example, an adhesive, and a screwing structure using a male screw and a female screw so as to be in close contact with the nozzle 130. When the attachment nozzle 150 is joined to the nozzle 130 using an adhesive, the attachment nozzle 150 may be detached from the nozzle 130 using an adhesive removal liquid or the like. The attachment nozzle 150 includes a blow-out hole 151 (another blow-out hole) penetrating therethrough. An opening area of the blow-out hole 151 is set to be smaller than an opening area of the blow-out hole 131.

According to the example of FIG. 11, since the attachment nozzle 150 is attached to the nozzle 130, an area when the gas collides with the surface Wa of the measurement object W becomes smaller. Therefore, the flow rate of the gas in the air sensor 120 changes in response to a narrower range of the surface Wa of the measurement object W. Accordingly, it is possible to more accurately measure the surface state of the measurement object W. According to the example of FIG. 11, the attachment nozzle 150 is detachably attached to the nozzle 130. Therefore, simply by attaching and detaching the attachment nozzle 150, the sensor unit 100 can be selectively used for the following two applications. That is, one application is to quickly measure the entire surface of the measurement object W using a nozzle having the blow-out hole 131 with a relatively large diameter. The other application is to accurately measure the surface state of the measurement object W using the attachment nozzle 150 having the blow-out hole 151 with a relatively small diameter.

(3) As long as the air sensor 120 is configured to be movable relative to the stage 10 and the measurement object W, one or both of the air sensor 120 and the stage may be moved.

(4) The processing device 1 may further include a camera for identifying a height, a position, and the like of the measurement object W placed on the stage 10.

(5) A shape of the measurement object W is not particularly limited. That is, the shape of the measurement object W may be a rectangular parallelepiped shape, a cylindrical shape, a polygonal columnar shape, an annular shape, a cylindrical shape, a gear shape, or the like. The processing device 1 may perform cylindrical grinding, internal grinding, centerless grinding, screw grinding, gear grinding, profile grinding, and cutting by the tool 22 depending on the shape and the processing purpose of the measurement object W.

(6) The processing device 1 may be any processing device as long as it processes the measurement object W by bringing the tool 22 into contact with the measurement object W. For example, the processing device 1 may be a grinding device, a cutting device, or a polishing device. When the processing device 1 is a cutting device, the tool 22 may be a cutting tool (for example, a turning tool, a milling tool, or the like). When the processing device 1 is a polishing device, the tool 22 may be a free abrasive grain or a fixed abrasive grain that is pressed against the measurement object W at a constant pressure.

OTHER EXAMPLES

Example 1. An example of a surface measuring device includes: a stage configured to allow a measurement object to be placed; a sensor unit disposed above the stage and configured to be movable relative to the stage; a supply unit configured to supply a gas to the sensor unit; and a control unit. The sensor unit includes first to N-th air sensors each configured to measure a flow rate of the gas supplied from the supply unit when the gas flows through an internal flow path, where N being a natural number of 2 or more, a base portion configured to hold the first to N-th air sensors arranged in a row in a first direction along a horizontal direction, and first to N-th nozzles communicating with the internal flow paths of the first to N-th air sensors respectively and each provided with a blow-out hole opened toward the stage. The control unit is configured to execute first processing of operating the supply unit such that the gas that has flowed through the internal flow paths is blown downward from the blow-out holes of the first to N-th nozzles, second processing of operating at least one of the stage and the sensor unit such that the sensor unit scans a surface of the measurement object during operation of the supply unit by the first processing, and third processing of calculating a separation distance between each of the first to N-th nozzles and the surface of the measurement object based on a flow rate of the gas measured in each of the first to N-th air sensors during scanning of the sensor unit by the second processing. In this case, the sensor unit scans the surface of the measurement object while blowing the gas toward the surface from the blow-out holes of the first to N-th nozzles. Then, the separation distance (gap) between each nozzle and the surface is calculated based on the flow rate of the gas measured by each of the first to N-th air sensors. Therefore, every time the sensor unit scans the surface, N pieces of data related to the surface shape of the measurement object are acquired at once. Therefore, compared to a case where one air sensor scans the entire surface of the measurement object, the surface shape of the entire surface of the measurement object can be measured at a higher speed. In the device according to Example 1, the air sensor is located upstream of the blow-out hole of the nozzle. Therefore, when the flow rate of the gas blown out from the blow-out hole changes as the separation distance between the nozzle and the surface of the measurement object changes, the flow rate of the gas also immediately changes in an air sensor located on the upstream side and in the same flow path as the blow-out hole. That is, an extremely high response speed is obtained. Therefore, according to the device of Example 1, it is possible to measure the surface shape of the measurement object at an extremely high speed.

Example 2. In the device according to Example 1, the control unit is configured to further execute fourth processing of acquiring in advance a model representing a relationship between a flow rate of the gas measured by one air sensor among the first to N-th air sensors and a separation distance between one nozzle that corresponds to the one air sensor among the first to N-th nozzles and a surface of a reference block placed on the stage when the gas that has flowed through the internal flow path of the one air sensor is blown out from the one nozzle onto the surface of the reference block, and the third processing may include calculating a separation distance between each of the first to N-th air sensors and the surface of the measurement object based on the model and the flow rate of the gas measured in each of the first to N-th air sensors during the scanning of the sensor unit by the second processing. In this case, by acquiring a model in advance, the separation distance between each air sensor and the surface of the measurement object can be estimated immediately from the flow rate of the gas measured by each air sensor. Therefore, it is possible to accurately and immediately estimate each separation distance according to the flow rate of the gas in each air sensor that changes every moment during the measurement of the surface shape of the measurement object by the sensor unit.

Example 3. In the device according to Example 1, the control unit is configured to further execute fourth processing of acquiring in advance, for the first to N-th air sensors, a model representing a relationship between a flow rate of the gas measured by an n-th air sensor and a separation distance between an n-th nozzle and a surface of a reference block placed on the stage when the gas that has flowed through the internal flow path of each of the first to N-th air sensors is blown out from the first to N-th nozzles to the surface of the reference block, where n being any natural number from 1 to N, and the third processing may include calculating a separation distance between each of the first to N-th air sensors and the surface of the measurement object based on the model and the flow rate of the gas measured in each of the first to N-th air sensors during the scanning of the sensor unit by the second processing. In this case, the same operation and effects as those of the device according to Example 2 can be obtained. In the device according to Example 3, a model can be acquired in advance for each air sensor. Therefore, even in a case where the characteristics are slightly different for each machine body of the air sensor due to a manufacturing error or the like, it is possible to more accurately calculate the separation distance between each air sensor and the surface of the measurement object using the model corresponding to each air sensor.

Example 4. In the device according to any one of Example 1 to Example 3, each of the first to N-th air sensors includes an inlet portion and an outlet portion communicating with the internal flow path, the first to N-th nozzles are provided on a bottom surface of the base portion such that the blow-out holes communicate with the outlet portions of the first to N-th air sensors correspondingly, and the base portion may have an internal space communicating with the inlet portions of the first to N-th air sensors and the supply unit. In this case, a total length of a flow path from the base portion to the blow-out hole of each nozzle can be further shortened. Therefore, the response speed of the flow rate of the gas in the air sensor with respect to a change in the separation distance between the nozzle and the surface of the measurement object becomes faster. Accordingly, the surface shape of the measurement object can be measured at a higher speed.

Example 5. In the device according to any one of Example 1 to Example 4, the second processing may include operating at least one of the stage and the sensor unit such that the sensor unit scans the surface of the measurement object a predetermined number of times in a second direction along the horizontal direction and intersecting the first direction, and the sensor unit moves, for each scan in the second direction, at a feed pitch smaller than an interval at which the first to N-th air sensors are adjacent to each other in the first direction, and operating at least one of the stage and the sensor unit such that the sensor unit moves in the second direction until reaching a region on the surface of the measurement object that is not scanned by the sensor unit. In this case, the sensor unit scans a region between adjacent nozzles on the surface of the measurement object at a fine feed pitch, and the sensor unit scans a region other than the region on the surface of the measurement object after the sensor unit is largely moved in the second direction. Therefore, the entire surface of the measurement object can be efficiently measured by one sensor unit.

Example 6. In the device according to any one of Example 1 to Example 5, the sensor unit may further include a plurality of attachment nozzles, each of which is provided with another blow-out hole smaller than the blow-out hole of each of the first to N-th nozzles, and is detachably attached to each of the first to N-th nozzles such that the another blow-out hole communicates with the blow-out hole in a state of being attached to each of the first to N-th nozzles. In this case, since the attachment nozzle is attached to the nozzle, an area when the gas collides with the surface of the measurement object becomes smaller. Therefore, the flow rate of the gas in the air sensor changes in response to a narrower range of the surface of the measurement object. Accordingly, it is possible to more accurately measure the surface state of the measurement object. In the device of Example 6, the attachment nozzle is detachably attached to the nozzle. Therefore, simply by attaching and detaching the attachment nozzle, the sensor unit can be selectively used for the following two applications. That is, one application is to quickly measure the entire surface of the measurement object using a nozzle having the blow-out hole with a relatively large diameter. Further, the other application is to accurately measure the surface state of the measurement object using the attachment nozzle having the another blow-out hole with a relatively small diameter.

Example 7. The device according to any one of Example 1 to Example 6 may further include a display unit, and the control unit may be configured to further execute fourth processing of displaying a surface shape of the measurement object based on the separation distance calculated by the third processing two-dimensionally or three-dimensionally on the display unit to according to positions of the first to N-th air sensors. In this case, an operator can easily grasp the surface shape of the measurement object visually.

Example 8. An example of a processing device includes: the surface measuring device according to any one of Example 1 to Example 7; a tool configured to process the measurement object; and a holding portion configured to hold the tool and the surface measuring device. In this case, the same operation and effects as those of the device according to Example 1 can be obtained. In addition, since the surface measuring device is held together with the tool by the holding portion, after the surface shape of the measurement object is measured by the sensor unit, the measurement object can be immediately machined by the tool based on the measurement data. Therefore, it is not necessary to move the measurement object between the measurement processing of the surface shape of the measurement object and processing on the measurement object. Accordingly, it is not necessary to adjust a position of the measurement object after the movement. As a result, a time from the measurement processing to the processing is shortened, so that productivity can be increased.

Example 9. An example of a surface measuring method is a method for measuring a surface of a measurement object placed on a stage using a sensor unit. The sensor unit includes first to N-th air sensors each configured to measure a flow rate of the gas supplied from the supply unit when the gas flows through an internal flow path, where N being a natural number of 2 or more, a base portion configured to hold the first to N-th air sensors arranged in a row in a first direction along a horizontal direction, and first to N-th nozzles communicating with the internal flow paths of the first to N-th air sensors respectively and each provided with a blow-out hole opened toward the stage. The example of the surface measuring method includes: a first step of blowing out the gas downward from the blow-out holes of the first to N-th nozzles through the internal flow paths; a second step of scanning the surface of the measurement object by the sensor unit while the gas is blown onto the surface of the measurement object in the first step; and a third step of calculating a separation distance between each of the first to N-th nozzles and the surface of the measurement object based on a flow rate of the gas measured in each of the first to N-th air sensors during the scanning of the sensor unit in the second step. In this case, the same operation and effects as those of the device according to Example 1 can be obtained.

The invention claimed is:

1. A surface measuring device comprising:

a stage configured to allow a measurement object to be placed;

a sensor unit disposed above the stage and configured to be movable relative to the stage;

a supply unit configured to supply gas to the sensor unit; and a control unit, wherein the sensor unit includes:

first to N-th air sensors each configured to measure a flow rate of the gas supplied from the supply unit when the gas flows through an internal flow path, where N being a natural number of 2 or more, a base portion configured to hold the first to N-th air sensors arranged in a row in a first direction along a horizontal direction, and first to N-th nozzles coupled to the base portion and communicating with the internal flow paths of the first to N-th air sensors respectively and each provided with a blow-out hole opened toward the stage, and wherein the control unit is configured to execute:

first processing of operating the supply unit such that the gas that has flowed through the internal flow paths is blown downward from the blow-out holes of the first to N-th nozzles, second processing of operating at least one of the stage and the sensor unit such that the sensor unit scans a surface of the measurement object during operation of the supply unit by the first processing, and third processing of calculating a separation distance between each of the first to N-th nozzles and the surface of the measurement object based on a flow rate of the gas measured in each of the first to N-th air sensors during scanning of the sensor unit by the second processing.

2. The device according to claim 1, wherein the control unit is configured to further execute fourth processing of acquiring in advance a model representing a relationship between a flow rate of the gas measured by one air sensor among the first to N-th air sensors and a separation distance between one nozzle that corresponds to the one air sensor among the first to N-th nozzles and a surface of a reference block placed on the stage when the gas that has flowed through the internal flow path of the one air sensor is blown out from the one nozzle onto the surface of the reference block, and wherein the third processing includes calculating a separation distance between each of the first to N-th air sensors and the surface of the measurement object based on the model and the flow rate of the gas measured in each of the first to N-th air sensors during the scanning of the sensor unit by the second processing.

3. The device according to claim 1, wherein the control unit is configured to further execute fourth processing of acquiring in advance, for the first to N-th air sensors, a model representing a relationship between a flow rate of the gas measured by an n-th air sensor and a separation distance between an n-th nozzle and a surface of a reference block placed on the stage when the gas that has flowed through the internal flow path of each of the first to N-th air sensors is blown out from the first to N-th nozzles to the surface of the reference block, where n being any natural number from 1 to N, and wherein the third processing includes calculating a separation distance between each of the first to N-th air sensors and the surface of the measurement object based on the model and the flow rate of the gas measured in each of the first to N-th air sensors during the scanning of the sensor unit by the second processing.

4. The device according to claim 1, wherein each of the first to N-th air sensors includes an inlet portion and an outlet portion communicating with the internal flow path, wherein the first to N-th nozzles are provided on a bottom surface of the base portion such that the blow-out holes communicate with the outlet portions of the first to N-th air sensors correspondingly, and wherein the base portion has an internal space communicating with the inlet portions of the first to N-th air sensors and the supply unit.

5. The device according to claim 1, wherein the second processing includes:

operating at least one of the stage and the sensor unit such that the sensor unit scans the surface of the measurement object a predetermined number of times in a second direction along the horizontal direction and intersecting the first direction, and the sensor unit moves, for each scan in the second direction, at a feed pitch smaller than an interval at which the first to N-th air sensors are adjacent to each other in the first direction, and operating at least one of the stage and the sensor unit such that the sensor unit moves in the second direction until reaching a region on the surface of the measurement object that is not scanned by the sensor unit.

6. The device according to claim 1, wherein the sensor unit further includes a plurality of attachment nozzles, each of which is provided with another blow-out hole smaller than the blow-out hole of each of the first to N-th nozzles, and is detachably attached to each of the first to N-th nozzles such that the another blow-out hole communicates with the blow-out hole in a state of being attached to each of the first to N-th nozzles.

7. The device according to claim 1, further comprising:

a display unit, wherein the control unit is configured to further execute fourth processing of displaying a surface shape of the measurement object based on the separation distance calculated by the third processing two-dimensionally or three-dimensionally on the display unit to according to positions of the first to N-th air sensors.

8. The device according to claim 1, wherein the base portion is fluidly coupled to the supply unit and configured to distribute the gas from the supply unit to the internal flow path of each air sensor.

9. The device according to claim 1, wherein base portion comprises an upper surface opposite a lower surface and a first side surface opposite a second side surface, wherein the supply unit is coupled to the first side surface, wherein the first to N-th air sensors are coupled to the second side surface, and wherein the first to N-th nozzles are coupled to the lower surface.

10. The device according to claim 1, wherein the base portion comprises first to N-th first connection holes arranged in a second row in the first direction and first to N-th second connection holes arranged in a third row in the first direction, and wherein each air sensor is coupled to a first connection hole and a second connection hole, such that the internal flow path is defined from the first connection hole to the second connection hole.

11. A processing device comprising:

the surface measuring device according to claim 1;

a tool configured to process the measurement object; and a holding portion configured to hold the tool and the surface measuring device.

12. A surface measuring method for measuring a surface of a measurement object placed on a stage using a sensor unit, the sensor unit includes:

first to N-th air sensors each configured to measure a flow rate of a gas supplied from a supply unit when the gas flows through an internal flow path, where N being a natural number of 2 or more, a base portion configured to hold the first to N-th air sensors arranged in a row in a first direction along a horizontal direction, and first to N-th nozzles communicating with the internal flow paths of the first to N-th air sensors respectively and each provided with a blow-out hole opened toward the stage, the surface measuring method comprising:

a first step of blowing out the gas downward from the blow-out holes of the first to N-th nozzles through the internal flow paths;

a second step of scanning the surface of the measurement object by the sensor unit while the gas is blown onto the surface of the measurement object in the first step;

a third step of calculating a separation distance between each of the first to N-th nozzles and the surface of the measurement object based on a flow rate of the gas measured in each of the first to N-th air sensors during the scanning of the sensor unit in the second step; and a fourth step of acquiring in advance a model representing a relationship between a flow rate of the gas measured by one air sensor among the first to N-th air sensors and a separation distance between one nozzle that corresponds to the one air sensor among the first to N-th nozzles and a surface of a reference block placed on the stage when the gas that has flowed through the internal flow path of the one air sensor is blown out from the one nozzle onto the surface of the reference block, wherein the third step includes calculating a separation distance between each of the first to N-th air sensors and the surface of the measurement object based on the model and the flow rate of the gas measured in each of the first to N-th air sensors during the scanning of the sensor unit by the second step.

13. The surface measuring method according to claim 12, wherein the second step includes:

operating at least one of the stage and the sensor unit such that the sensor unit scans the surface of the measurement object a predetermined number of times in a second direction along the horizontal direction and intersecting the first direction, and the sensor unit moves, for each scan in the second direction, at a feed pitch smaller than an interval at which the first to N-th air sensors are adjacent to each other in the first direction; and operating at least one of the stage and the sensor unit such that the sensor unit moves in the second direction until reaching a region on the surface of the measurement object that is not scanned by the sensor unit.

* * * * *